(12) United States Patent
Hart et al.

(10) Patent No.: US 9,125,214 B2
(45) Date of Patent: Sep. 1, 2015

(54) DYNAMIC ENABLING OF WIDER CHANNEL TRANSMISSIONS WITH RADIO MONITORING

(75) Inventors: Brian D. Hart, Sunnyvale, CA (US); Douglas Chan, San Jose, CA (US); David Kloper, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 13/602,562

(22) Filed: Sep. 4, 2012

(65) Prior Publication Data

US 2014/0064101 A1 Mar. 6, 2014

(51) Int. Cl.
*H04W 72/04* (2009.01)
*H04W 24/00* (2009.01)
*H04W 74/08* (2009.01)
*H04L 5/00* (2006.01)
*H04W 84/12* (2009.01)

(52) U.S. Cl.
CPC ............ H04W 74/0808 (2013.01); H04L 5/00 (2013.01); *H04W 84/12* (2013.01)

(58) Field of Classification Search
CPC ............ H04L 69/16; H04L 2012/6456; H04L 1/0026; H04L 12/2863; H04L 12/40065; H04B 1/69; H04N 1/32797
USPC .......................................................... 370/241
See application file for complete search history.

(56) References Cited

U.S. PATENT DOCUMENTS

| | | | |
|---|---|---|---|
| 6,047,175 A | 4/2000 | Trompower | |
| 6,065,060 A * | 5/2000 | Liu et al. | 709/233 |
| 6,215,982 B1 | 4/2001 | Trompower | |
| 6,829,486 B2 | 12/2004 | McKenna et al. | |
| 7,075,906 B2 | 7/2006 | Douglas et al. | |

(Continued)

FOREIGN PATENT DOCUMENTS

| | | | |
|---|---|---|---|
| WO | 2006045097 A2 | 4/2006 |
| WO | 2006069176 A2 | 6/2006 |

(Continued)

OTHER PUBLICATIONS

IEEE, "IEEE P802.11ac/D3.0—Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operations in Bands below 6 GHz", Jun. 2012, pp. i-360.

(Continued)

*Primary Examiner* — Omar Ghowrwal
*Assistant Examiner* — Ellen A Kirillova
(74) *Attorney, Agent, or Firm* — Edell, Shapiro & Finnan, LLC (57) ABSTRACT

Wider bandwidth transmissions are dynamically enabled in a wireless networking environment. During a transmit opportunity time interval for a wireless network device, a transmission is sent in a primary channel in a frequency band in which the primary channel and a secondary channel may be used simultaneously to send a wider bandwidth transmission. Activity is monitored in the secondary channel. A determination is made as to whether the secondary channel is free based on the monitoring. When it is determined that the secondary channel is free, the wider bandwidth transmission is sent in the primary and secondary channels.

27 Claims, 11 Drawing Sheets

(56) References Cited

U.S. PATENT DOCUMENTS

| | | | |
|---|---|---|---|
| 7,197,013 B2 | 3/2007 | Douglas et al. | |
| 7,280,607 B2 | 10/2007 | McCorkle et al. | |
| 7,363,008 B2 | 4/2008 | Hassan et al. | |
| 7,372,866 B2 | 5/2008 | Jang et al. | |
| 7,558,592 B2 | 7/2009 | Hart et al. | |
| 7,593,356 B1 | 9/2009 | Friday et al. | |
| 8,125,919 B1* | 2/2012 | Khanka et al. | 370/252 |
| 8,155,482 B2 | 4/2012 | Chan et al. | |
| 2002/0010939 A1* | 1/2002 | Fujita et al. | 725/95 |
| 2002/0101888 A1* | 8/2002 | Keck et al. | 370/537 |
| 2002/0174377 A1* | 11/2002 | Davies | 714/6 |
| 2003/0054827 A1 | 3/2003 | Schmidl et al. | |
| 2007/0253385 A1* | 11/2007 | Li et al. | 370/338 |
| 2007/0287390 A1* | 12/2007 | Murphy et al. | 455/85 |
| 2010/0091716 A1* | 4/2010 | Bonta et al. | 370/329 |
| 2010/0189199 A1 | 7/2010 | Lou et al. | |
| 2010/0222065 A1* | 9/2010 | De Pasquale et al. | 455/450 |
| 2011/0222486 A1 | 9/2011 | Hart | |
| 2011/0305288 A1* | 12/2011 | Liu et al. | 375/260 |
| 2012/0026997 A1* | 2/2012 | Seok et al. | 370/338 |
| 2012/0082040 A1* | 4/2012 | Gong et al. | 370/252 |
| 2012/0147804 A1 | 6/2012 | Hedayat et al. | |
| 2012/0163331 A1 | 6/2012 | Chan et al. | |
| 2012/0182963 A1 | 7/2012 | Kneckt et al. | |

FOREIGN PATENT DOCUMENTS

| | | | |
|---|---|---|---|
| WO | 2006045097 A3 | 8/2006 | |
| WO | 2011135392 A1 | 11/2011 | |

OTHER PUBLICATIONS

International Search Report and Written Opinion in counterpart International Application No. PCT/US2013/057491, mailed Mar. 13, 2014, 12 pages.

Kneckt, "Overlapping BSS Co-Existence," IEEE 802.11-10/1303r6, Nov. 11, 2010, pp. 1-19.

IEEE: IEEE P802.11n/D2.00 Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment: Enhancements for Higher Throughput Feb. 2007, pp. 199-202.

Devin Akin: "802.11n 20/40 MHz BSS Mode Rules" CWNP Wireless Certification and Wireless Training, Aug. 29, 2007.

\* cited by examiner

DYNAMIC ENABLING OF WIDER CHANNEL TRANSMISSIONS WITH RADIO MONITORING

TECHNICAL FIELD

The present disclosure relates to wireless networks and devices.

BACKGROUND

The IEEE 802.11ac amendment allows for transmissions with wider channel widths, e.g., of 80 MHz, 160 MHz or 80+80 MHz. While this represents a significant gain in data rates, an 802.11ac station may not always be able to use the wider channels to transmit a packet due to an overlap with other Basic Service Sets that are operating with different primary channels and narrower bandwidths. This is because portions of the 80, 160 or 80+80 MHz 802.11ac channels may already be busy from a narrower channel width transmission by a station in one of these overlapping Basic Service Sets. However, the narrow channel width transmission may finish before the transmit opportunity of the 802.11ac station ends, such that the secondary channel is free for a wider channel width transmission. Thus, there is an opportunity to transmit a wider channel width transmission that is not being exploited.

DESCRIPTION OF EXAMPLE EMBODIMENTS

Overview

Techniques are provided to dynamically enable wider bandwidth transmissions in a wireless networking environment. During a transmit opportunity time interval for a wireless network device, a transmission is sent in a primary channel in a frequency band in which the primary channel and a secondary channel may be used simultaneously to send a wider bandwidth transmission. Activity is monitored in the secondary channel. A determination is made as to whether the secondary channel is free based on the monitoring. When it is determined that the secondary channel is free, the wider bandwidth transmission is sent in the primary and secondary channels.

Example Embodiments

An apparatus and related methodology are provided herein to dynamically enable wider channel transmissions. In one form, the wider channel transmissions are enabled using an auxiliary radio that can monitor the status of the secondary channels to determine if they become available during the transmit opportunity window of a wireless device that is seeking to make a wider channel transmission. In another form, the dynamic enabling of wider channel transmissions is achieved without the addition of another radio, i.e., using a single radio, or when the other radio is occupied with other functions.

Figure 1:
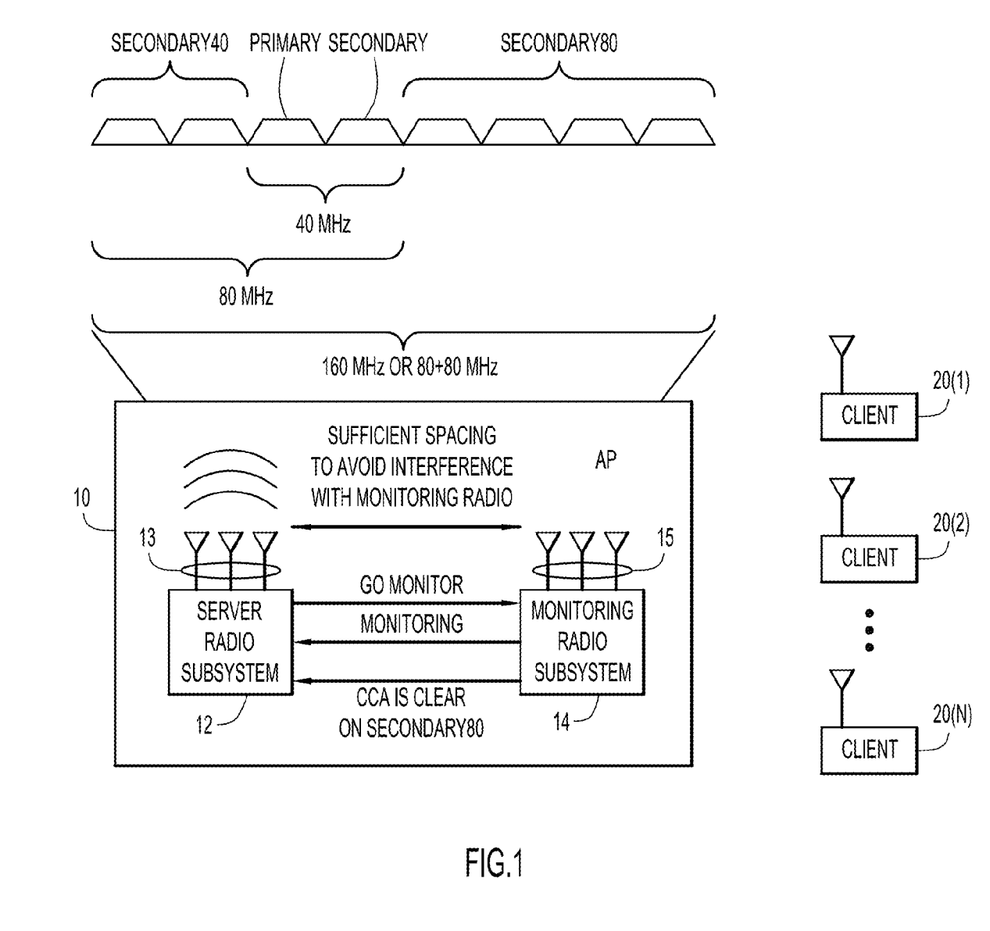
FIG. 1 is a block diagram of a wireless network device configured to dynamically transmit wider channel width transmissions.

Referring first to FIG. 1, a diagram is shown of a wireless local area network (WLAN) access point (AP) 10 configured to serve one or more WLAN clients 20(1)-20(N). The AP 10 comprises a serving radio subsystem 12 and a monitoring radio subsystem 14. The antennas for the serving radio subsystem 12 are shown collectively at reference numeral 13, and the antennas for the monitoring radio subsystem 14 are shown collectively at reference numeral 15. The details of the radio subsystems 12 and 14 are described hereinafter in connection with FIGS. 4 and 5.

FIG. 1 also shows that the AP 10 is configured to operate in a frequency spectrum in which channels are allocated for use as primary channels and secondary channels, e.g., in accordance with the IEEE 802.11ac amendment. A primary channel is a set of one or more radio frequency (RF) channels that is the lowest denomination of RF channels used by a wireless network when it is not operating in the wider bandwidth mode and a secondary channel is one or more RF channels used in conjunction with a primary channel when a wireless network is operating in the wider bandwidth mode, such that a wider bandwidth transmission can be sent in the primary channel and secondary channel simultaneously.

The IEEE 802.11ac amendment allows for transmissions with channel widths of 80 MHz, 160 MHz or 80+80 MHz. While this represents a significant gain in data rates, an 802.11ac STA may not always be able to use the wider channels to transmit a packet due to overlapping with other Basic Service Sets (BSSs) that are operating with different primary channels and narrower bandwidths. This is because portions of the 80 MHz, 160 MHz or 80+80 MHz 11ac channel may already be busy from a narrower channel width transmission by a client or AP in one of these overlapping BSSs. For example, if a 40 MHz transmission is occurring in the secondary80 channel segment of an 802.11ac BSS operating in the 80+80 MHz mode, then 802.11ac APs or clients in the 80+80 MHz BSS can still use the channel by transmitting a 80 MHz packet (or 20 or 40 MHz) in the primary 80 MHz channel segment.

Now consider that the 40 MHz transmission in the secondary80 channel segment finishes before the 802.11ac Transmit Opportunity (TXOP) ends. This means the secondary80 channel segment is now freed up for an 80+80 MHz transmission but the 802.11ac AP or client, which was forced to transmit at less than 80+80 MHz when its TXOP began, and is therefore not fully utilizing the available channel bandwidth (at that time) in the remainder of its TXOP. If the 802.11ac AP or client could switch to 80+80 MHz packets for subsequent transmissions in the remaining TXOP duration, then there is more efficient channel usage, which leads to increased 802.11ac WLAN throughput.

Currently, 802.11ac devices typically have a single co-located radio, and as a result, they cannot monitor the status of another channel simultaneously while transmitting and cannot feasibly take advantage of the scenario described above. However, as shown in FIG. 1, the additional 5 GHz monitoring radio subsystem 14 is provided and configured to work in conjunction with the 5 GHz primary radio subsystem 12. The monitoring radio subsystem 14 may include a receive-only radio or a full-function transmit/receive radio. The latter configuration (transmit and receive) allows it to serve clients at the AP's location but on a different channel than that used by the primary radio. The former configuration (receive only), allows for handling the primary radio's off-channel scanning duties, hence providing more accurate RF data for radio resource management and other functions.

As described hereinafter in connection with FIG. 7, similar features and functions afforded by the additional monitoring radio subsystem 14 can be provided using a single radio subsystem.

The following describes advanced features that exploit tight transmit spectral masks. Recent advances in RF Micro-Electro-Mechanical Systems (MEMS) front-ends propose to achieve −55 dBr immediate adjacent transmit spectral masks (and −60 dBr at 1.5*bandwidth from the center frequency) at full transmit powers (and −75 dBr immediate adjacent transmit spectral masks at lower transmit powers). Given such marked progress in this area, a further 11 dB improvement at commercial power levels in future hardware iterations is achievable, and in the absence of such progress, 11 dB improvement can be achieved with external hardware filtering. Such filtering is effective in an 80+80 MHz channel when the two 80 MHz segments are well separated (e.g., one within 5.15-5.35 GHz and one within 5.47-5.85 GHz), for a total of −71 dBr sidelobes in the transmit spectral mask.

This spectral mask/filtering requirement can be further relaxed when the antennas of the monitoring radio subsystem 14 are mounted on the opposite side of the AP from the primary radio, and benefit from attenuation from the intervening metal of the box of the AP 10. This is shown in FIG. 1 where the physical spacing between the antennas 13 of the primary radio subsystem 12 and the antennas 15 of the monitoring radio subsystem 14 is sufficient to prevent transmissions made by the primary radio subsystem 12 from interfering with the monitoring radio subsystem 14.

The monitoring radio subsystem 14 is configured to monitor for the absence of transmissions in the secondary80 channel segment in order to switch to a wider bandwidth transmission, e.g., an 80+80 MHz transmission, after a designated backoff in the secondary80 channel segment, thus increasing the channel utilization efficiency. A general operational flow for this is shown in FIG. 1, whereby the serving radio subsystem 12 sends a "Go monitor" command to the monitoring radio subsystem 14. In response, the monitoring radio subsystem 14 sends a message "Monitoring" to confirm to the serving radio subsystem that it is monitoring. When the monitoring radio subsystem 14 determines that there is no activity on the secondary channel, e.g., the secondary80 channel segment, exceeding a clear channel access (CCA) threshold, then it sends a message to the serving radio subsystem 12 indicating that the CCA is clear on the secondary80 channel segment. This will allow the serving radio subsystem 12 to begin using the secondary80 channel segment for the remainder of the TXOP.

Figure 2:
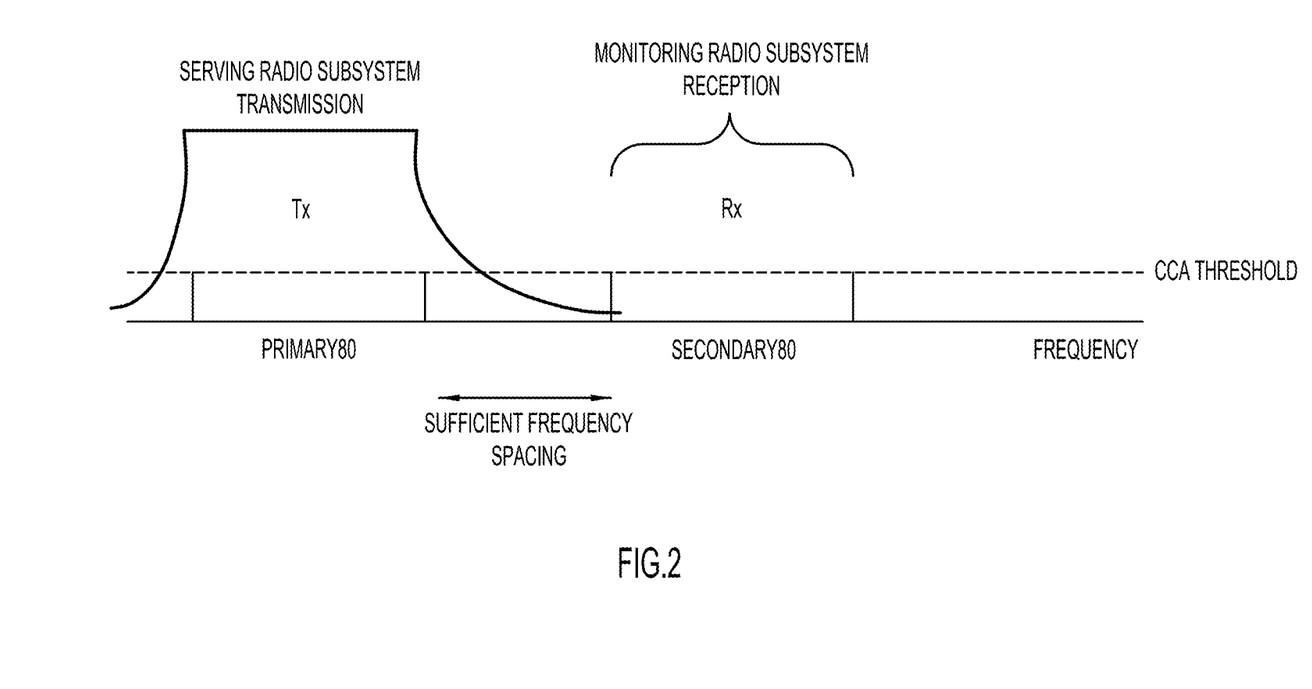
FIG. 2 is a signal plot illustrating separation between primary and secondary channels for operation of the device shown in FIG. 1.

Reference is now made to FIG. 2. FIG. 2 illustrates the impact that a transmission made by the serving radio subsystem in a primary channel has on the secondary channel. The spacing between the primary channel, e.g., primary80 channel, and the secondary channel, e.g., secondary80 channel, may be chosen to minimize adjacent channel leakage from the primary80 channel to the secondary80 channel.

In one example, the adjacent channel leakage is 20 dBm [conducted transmit power]+2 dBi [transmit antenna gain−of the serving radio subsystem]+2 dBi [receive antenna gain−of the monitoring radio subsystem]−(47−20)[path loss at 1 m converted to path loss at 0.1 m]−71 dB [transmit spectral mask]=−74 dBm [RSSI across 80 MHz]; in other words, −77 dBm over 40 MHz receive bandwidth, or −80 dBm over a 20 MHz receive bandwidth.

The path loss is through-AP inter-radio attenuation and would relax transmit spectral mask requirements, and assumes far-field analysis. A classic approximation is that the far field starts at 2 wavelengths, which is 0.11 m at 5.5 GHz.

The IEEE 802.11ac amendment requires that CCA be triggered at −69, −72 and −72 dBm for 80, 40 and 20 MHz 802.11 transmissions respectively, and in all cases those transmissions have at least a 5 dB Signal-to-Interference-Plus-Noise Ratio (SINR) relative to the local interference. There are even higher SINRs if the transmit power is decreased below 20 dBm (or a lower SINR is needed if Multiple-Input Multiple-Output reception is used). Given that dynamic enabling of wider transmissions has the most practicality in dense environments where it is unlikely that 20 dBm would be selected (10 or 15 dBm are more likely), then it is feasible for hardware to be designed with a relaxed requirement of, for example, −66 or −61 dBm transmit spectral mask sidelobes. Taken together with through-AP inter-radio attenuation, this can easily be implemented given currently available hardware.

In high density AP deployments, it is not uncommon to reduce the AP's transmit power and/or raise its receive CCA and Start of Packet (SOP) sensitivity. In such cases, less filtering is needed to allow the monitoring radio subsystem to effectively monitor while the serving radio subsystem is transmitting.

The extra monitoring radio subsystem 14 need not be dedicated to a single function. It may also perform other functions, such as wireless intrusion detection system (WIDS) monitoring on the secondary channel. It could also be that both radio subsystems are servicing clients on different primary channels while supporting bandwidth expansion for each other, and trading the "serving"-"monitoring" relationship as needed.

Figure 3:
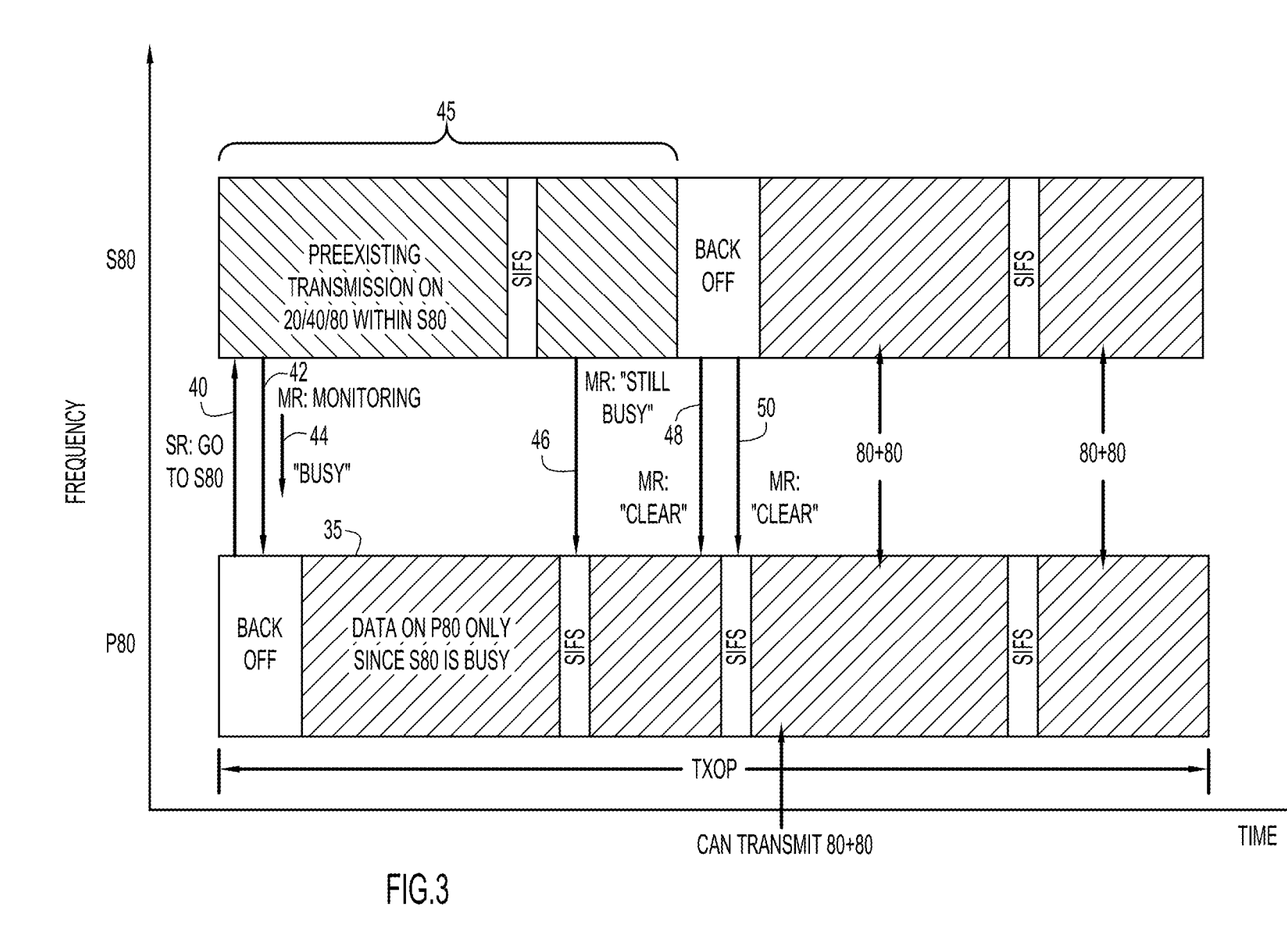
FIG. 3 is a more detailed diagram illustrating activity in primary and secondary channels during operation of the device shown in FIG. 1.

Reference is now made to FIG. 3 for a more detailed description of an example that employs the non-contiguous 80+80 MHz mode of IEEE 802.11ac. In 802.11ac, 160 MHz transmissions can occur non-contiguously via two 80 MHz channels. When an 802.11ac AP of an 80+80 MHz BSS has packets to be transmitted, it performs a CCA evaluation on its primary, secondary (=secondary20), secondary40 and secondary80 channel segments according to the rules stipulated by the 802.11ac amendment. If the AP finds that CCA is clear for these portions of the channel, then the AP can transmit an 80+80 MHz packet in the ensuing TXOP, thus fully utilizing its channel. The primary80 (P80) and secondary80 (S80) channels are shown in FIG. 3 with a spacing between them.

If the AP finds the secondary80 channel to be busy with transmissions, then the AP can transmit an 80 MHz packet in its primary 80 MHz (primary80) channel for the time-being as shown at reference numeral 35, thus, still utilizing half of the 80+80 channel bandwidth. As this transmission occurs, the AP's serving radio subsystem will command the monitoring radio subsystem to monitor activities on the secondary80 channel, as shown at reference numeral 40 in FIG. 3. The monitoring radio subsystem confirms back that it is monitoring at 42, and in this example, the S80 channel is found to be busy as shown at 44, because there is a pre-existing transmission 45 occurring within S80.

The monitoring radio subsystem continues monitoring activity on the S80 channel and reports again at 46 that S80 is still busy, but some time later at 48 reports that S80 is clear. Consider at this stage the event that the S80 transmissions 45 (from another device) have ended and the AP's TXOP is not finished. When the AP finishes its current 80 MHz packet transmission in P80, the monitoring radio subsystem reports that the CCA of the secondary80 is still clear at 50. Then, after a designated backoff (BOK) to avoid collisions on the S80, the AP can begin transmission of 80+80 MHz packets (at the start of a transmit PLCP Protocol Data Unit (PPDU)) until the end of its TXOP, as shown in FIG. 3.

The transmission in S80 can be made by the serving radio subsystem 12 or by the monitoring radio subsystem 14 (if it has transmit capabilities), i.e., "ping-ponging" transmitters. Still, making the 80 MHz transmission in S80 with the serving radio subsystems minimizes packet transfers and buffering complications.

These techniques are also applicable to 40 MHz, 80 MHz, and contiguous 160 MHz scenarios, and in general, any wider channel bandwidth(s) that might be adopted by a standard such as IEEE 802.11 in the future, conditional on a 6 dB (for 10 dBm transmit power operation) to 16 dB (for full 20 dBm transmit power operation) improvement to the transmit spectral mask (e.g., via further RF MEMS development) or from through-AP inter-radio attenuation. (These numbers arise because previously it was explained that 20 dBm required a −71 dBm mask, and RF MEMS hardware should deliver a −55 dB immediate adjacent channel mask.) The AP described herein is assumed to be equipped with a clean-enough serving radio so that the monitoring radio that can receive or monitor the channel status on channels other than those that are currently being used by the serving radio's transmissions.

When an 802.11ac AP of an 80-MHz BSS has packets to be transmitted, it performs CCA on its primary, secondary and secondary40 portions of the channel according to the rules stipulated by the IEEE 802.11ac amendment. If the AP finds that CCA is clear for these portions of the channel, then the AP can transmit an 80 MHz packet in the ensuing TXOP, thus fully utilizing its channel. But if the AP finds that the secondary40 is occupied by some 20 or 40 MHz transmissions, probably from an OBSS, then the AP can transmit a 40 MHz packet (with its serving radio subsystem) in the ensuing TXOP, thus still utilizing half its channel. As the transmission occurs, the 802.11ac AP's monitoring radio subsystem will then also monitor the activities on the secondary40. Now consider the event that transmissions on the secondary40 have ended such that its CCA becomes clear as determined by the monitoring radio subsystem, and the AP's TXOP has not finished. When the AP finishes its current 40 MHz packet transmission and the CCA of the secondary40 is still clear, the AP performs the designated secondary40 backoff then begins transmission of 80 MHz packets until the end of its TXOP.

These techniques are also applicable for 802.11n 40 MHz channels as well, i.e., transmitting a 20 MHz packet when the secondary channel is busy and when it becomes clear then transmitting a 40 MHz packet in the remaining TXOP. Sometimes an AP may not wish to use secondary channel(s) not because they are occupied by existing transmission(s) but because of channel conditions, e.g. noise or non-WLAN interferers' RF energy. The AP may have determined the channel conditions of the secondary channels to be unsuitable for a low error transmission. In such situations, it may be more efficient to not use those portions of the channel until their conditions improve, which can also be determined by the monitoring radio subsystem.

Figure 4:
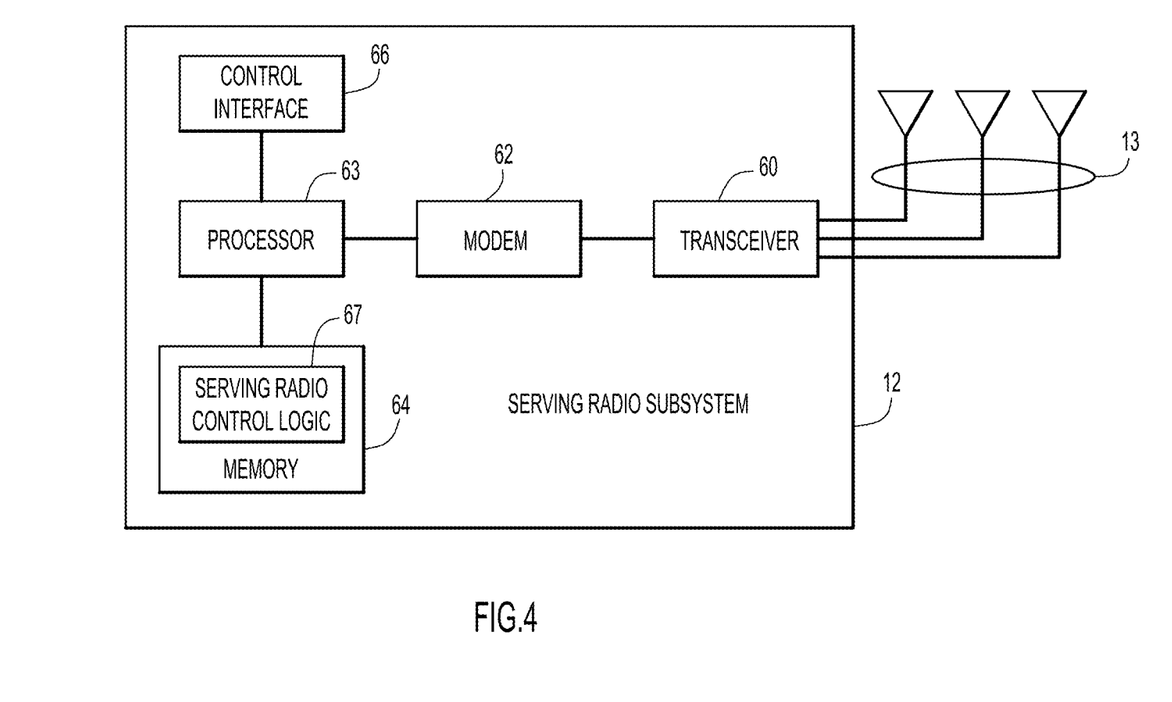
FIG. 4 is an example of a block diagram of a serving radio subsystem in the device of FIG. 1.

Reference is now made to FIG. 4 for a description of a block diagram of the serving radio subsystem 12 configured to perform the operations described herein. The serving radio subsystem 12 comprises a transceiver 60, a modem 62, a processor 63, a memory 64 and a control interface 66. The transceiver 60 is configured to transmit and receive signals via the antennas 13, and the modem 62 is configured to perform baseband signal modulation and demodulation. The processor 63 is a microprocessor or microcontroller configured to perform overall control functions for the serving radio subsystem 12 and to facilitate communications with other subsystems in the AP, e.g., the monitoring radio subsystem 14. The memory 64 stores instructions that are executed by the processor 63 to enable the processor to perform its operations. For example, the memory 64 stores instructions for serving radio control logic 67 that enable the serving radio subsystem 12 to perform the operations described herein.

Figure 5:
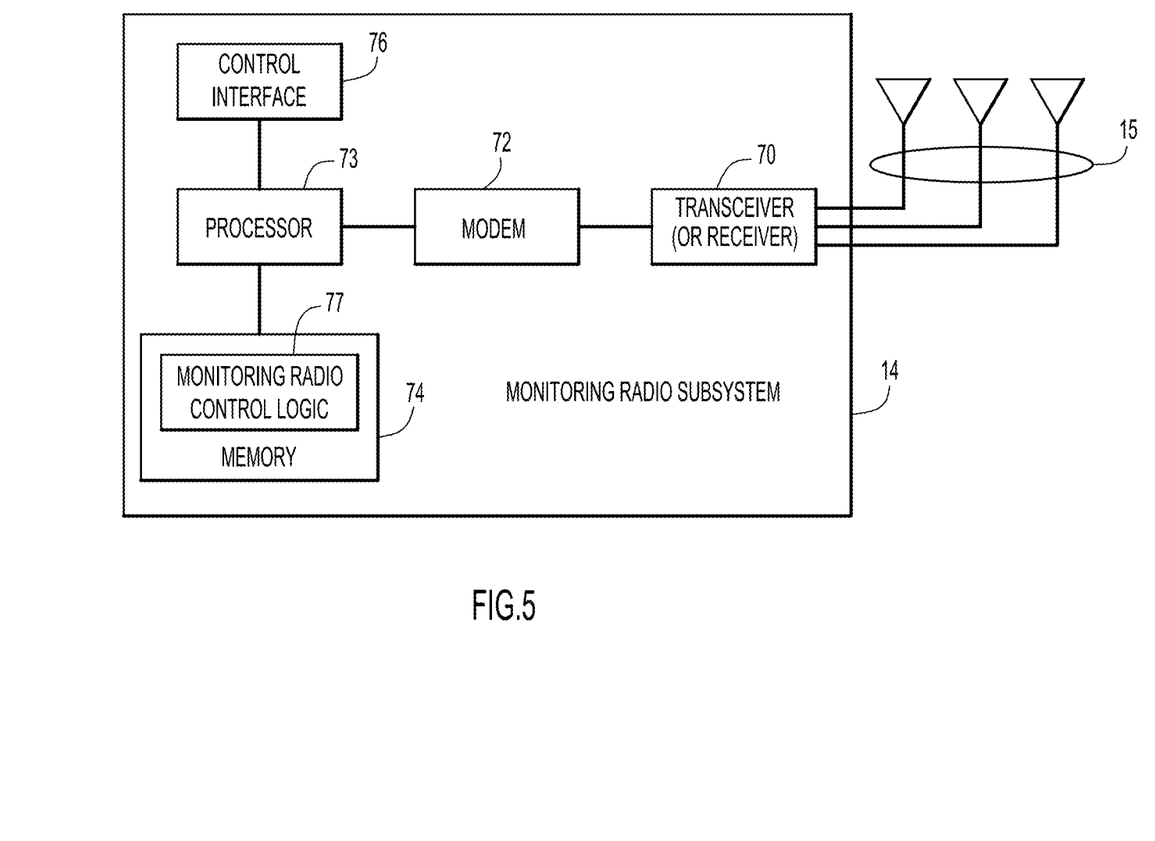
FIG. 5 is an example of a block diagram of a monitoring radio subsystem in the device of FIG. 1.

FIG. 5 shows a block diagram of the monitoring radio subsystem 14 configured to perform the operations described herein. The monitoring radio subsystem 14 comprises a transceiver 70, a modem 72, a processor 73, memory 64 and a control interface 76. The transceiver 70 is configured to transmit and receive signals via the antennas 15 or is a receiver configured to receive signals via antennas 15. The modem 72 is configured to perform baseband signal modulation and demodulation. The processor 73 is a microprocessor or microcontroller configured to perform overall control functions for the monitoring radio subsystem 12 and to facilitate communications with other subsystems in the AP, e.g., the serving radio subsystem 12. The memory 74 stores instructions that are executed by the processor 73 to enable the processor to perform its operations. For example, the memory 74 stores instructions for monitoring radio control logic 77 that enable the monitoring radio subsystem 14 to perform the operations described herein.

The memory 64 in FIG. 4 and memory 74 in FIG. 5 may comprise read only memory (ROM), random access memory (RAM), magnetic disk storage media devices, optical storage media devices, flash memory devices, electrical, optical, or other physical/tangible memory storage devices. Thus, in general, the memory 64 and 74 may comprise one or more tangible (non-transitory) computer readable storage media (e.g., a memory device) encoded with software comprising computer executable instructions and when the software is executed it is operable to perform the operations described herein.

Figure 6A:
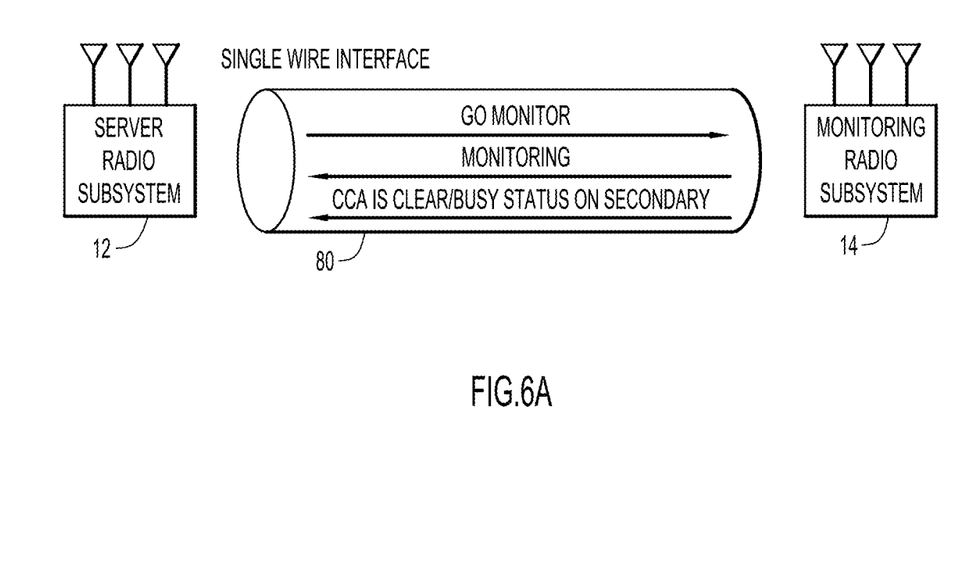
FIGS. 6A-6C are diagrams showing examples of signaling interfaces between the serving radio subsystem and the monitoring radio subsystem.
Figures 6B, 6C:
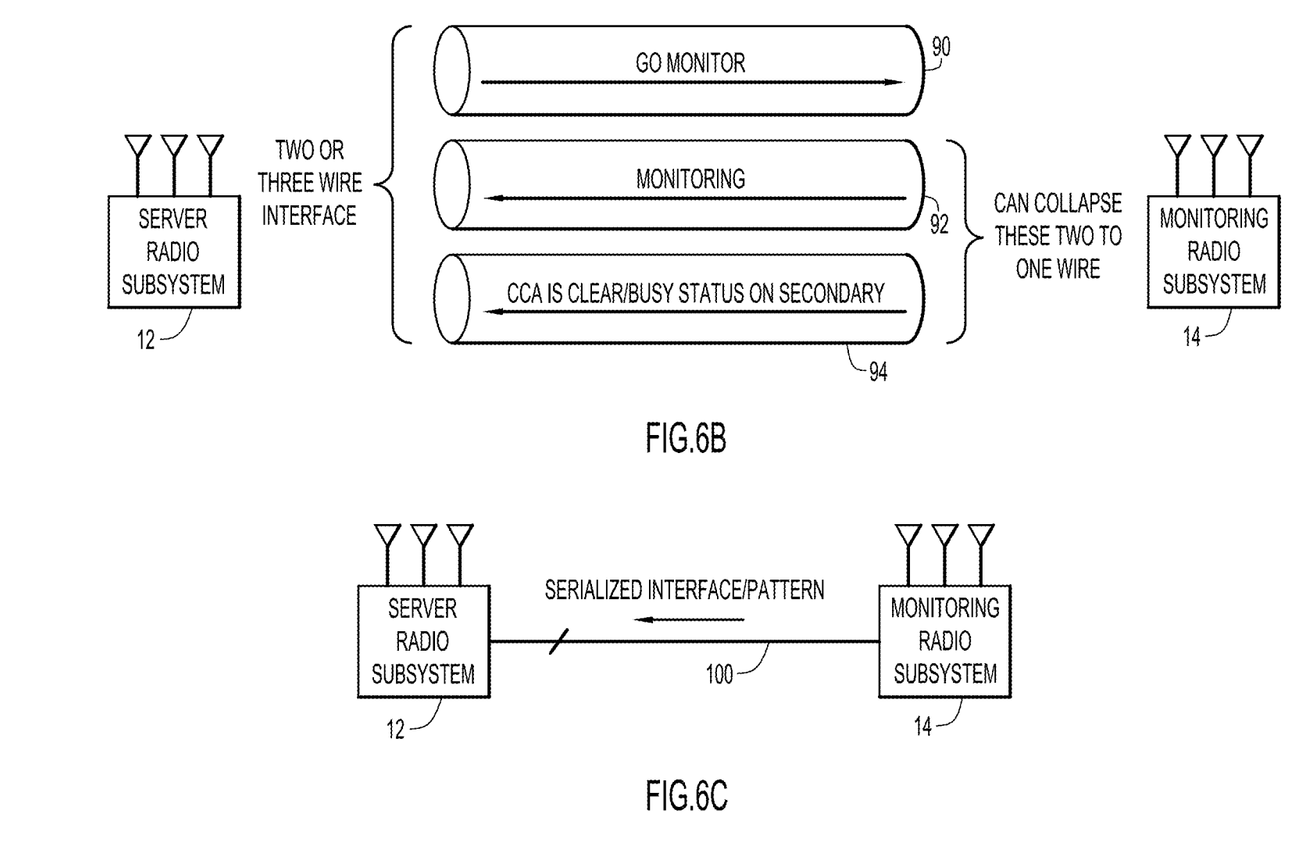

FIGS. 6A-6C illustrate various forms of an interface between the serving radio subsystem 12 and monitoring radio subsystem 14. The control interfaces 66 and 76 of the serving radio subsystem 12 and monitoring radio subsystem 14, respectively, are designed to coordinate channel access between multiple media access control (MAC) cores within the AP according to these interfaces.

FIG. 6A shows an example interface comprising a single control wire 80 between the serving radio subsystem 12 and the monitoring radio subsystem 14. Over the wire 80, the serving radio subsystem 12 sends a command "Go monitor" to the monitoring radio subsystem 14. The monitoring radio subsystem 14 continuously monitors the secondary channel (e.g., secondary80 of an 80+80 MHz bandwidth) and sends back over the wire 80 a response confirming that it is monitoring. The monitoring radio subsystem 14 also sends an indication of the CCA idle/busy status of the secondary channel to the serving radio subsystem 12.

FIG. 6B shows an example interface comprising three wires between the serving radio subsystem 12 and the monitoring radio subsystem 14. Wire 90 is used by the serving radio subsystem 12 to signal to the monitoring radio subsystem 14 that the monitoring radio subsystem 14 needs to begin monitoring the secondary channel (e.g., secondary80), such as when the serving radio subsystem 12 starts a transmission on the primary channel. This frees up the monitoring radio subsystem 14 to potentially monitor elsewhere at other times. Wire 92 is for the monitoring radio subsystem 14 to inform the serving radio subsystem 12 that the monitoring radio subsystem 14 has been listening on the secondary channel for a long enough time (e.g., Point Coordination Function-IFS), such that the CCA determination is now valid. Wire 94 is for the monitoring radio subsystem 14 to signal the current CCA idle/busy status to the serving radio subsystem 12.

A variation to the arrangement shown in FIG. 6B is to collapse the wires 92 and 94 into a single wire. While the monitoring radio subsystem 14 is operating off-channel or the monitoring radio subsystem 14 has not dwelt for a long enough time on the secondary channel to have a valid CCA, then the monitoring radio subsystem 14 reports busy on 92, otherwise the monitoring radio subsystem 14 uses wire 92 to signal the current CCA idle/busy status to the serving radio subsystem 12.

Referring to FIG. 6C, instead of wires, the various signaling can be communicated via messages passed over a bus (or sequence of buses) 100 that ultimately connect the serving radio subsystem 12 and monitoring radio subsystem 14. For example, the bus may be a Serial Peripheral Interface (SPI) Bus, though other bus protocol standards may be employed. A further variation is to piggyback a CCA idle/busy signal in a message for conveying clear-to-transmit when coexisting with Bluetooth™ devices. In yet another variation, change in CCA status can also be conveyed via a predetermined shifting pattern of the signals in a serial interface. In general, any serialized shift pattern can be used to indicate CCA status from the monitoring radio subsystem 14 to the serving radio subsystem 12. In still another example, a "mailbox interrupt" or hardware interrupt may be employed to cause a low latency response to the request/status.

Other information can be carried with the signaling between the monitoring radio subsystem 14 and the serving radio subsystem 12, either through a wider bus of signals, or longer serial shift patterns. Some examples of other information include:

An indication of which Access Class (AC) should be validated before asserting the channel is clear. This may involve listening to ensure that the appropriate Arbitration Inter-Frame Spacing (AIFS) is idle.

An indication of when the current transmission will end, and when received Block Acknowledgment (BA) is expected to start and end. This could allow extending Network Allocation Vector (NAV) protection from the monitoring radio subsystem to the serving radio subsystem, and to enable the AP to send a Clear-to-Send (CTS) to itself to reserve the channel aligning to end at the same time as the BA.

Figure 7:
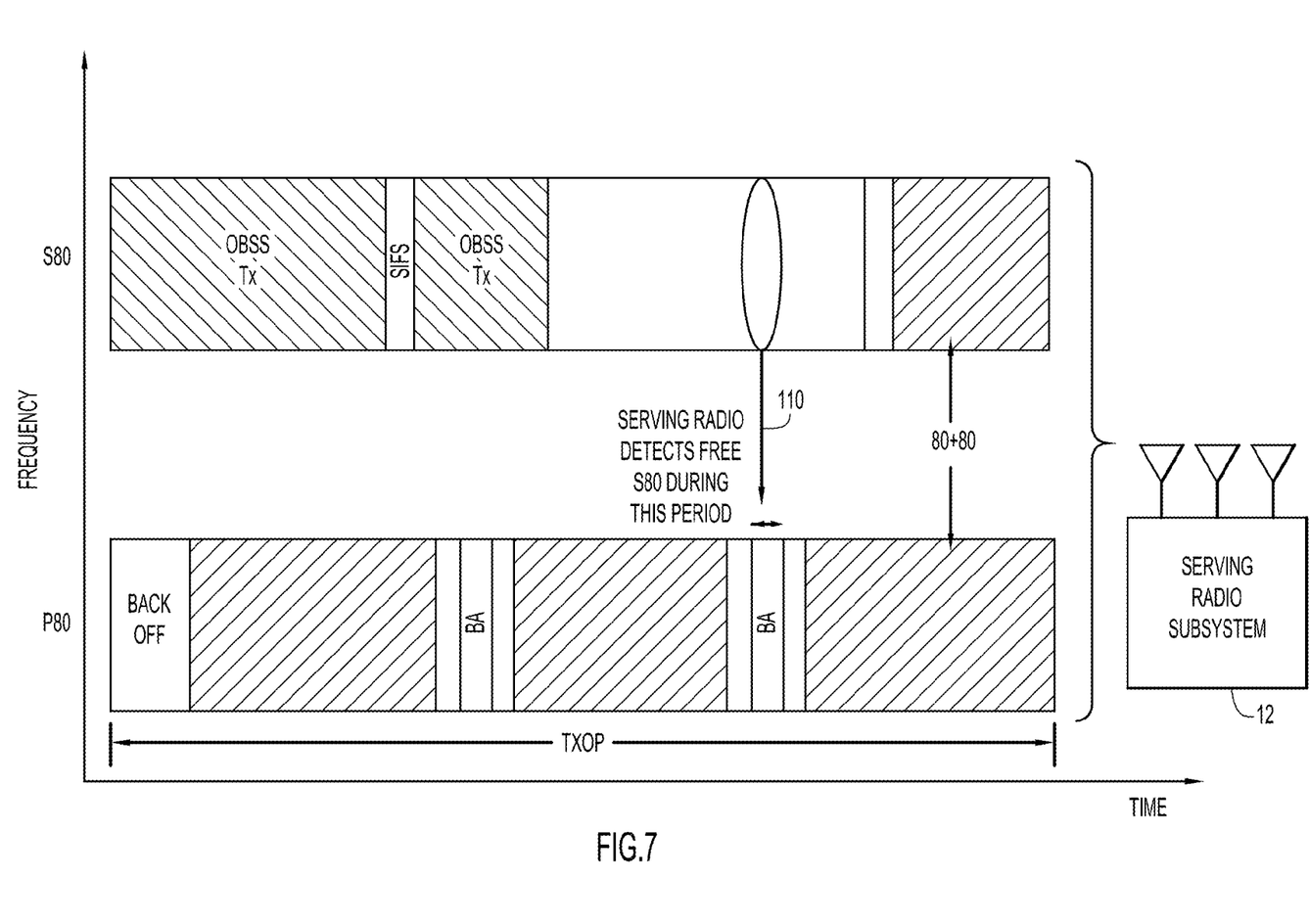
FIG. 7 is a diagram depicting an example in which the dynamic enabling of wider channel width transmissions is achieved with a single radio subsystem.

Reference is now made to FIG. 7 for a description of still another variation that is useful when a monitoring radio subsystem is not included, and also at times when a monitoring radio subsystem is included, but is occupied with other functions. Without loss of generality, the 80+80 MHz mode is used to describe this variation, as an example.

Consider a data exchange with a transmission from the AP and an ACK to the AP. The AP's serving radio subsystem 12 can normally begin detecting CCA on both the primary80 and secondary80 channels immediately after the data frame transmission is completed, as it is waiting and receiving the ACK. If the serving radio subsystem 12 finds the secondary80 channel to be CCA idle for enough time (e.g., a PIFS interval), then the entire 80+80 MHz channel can be utilized in the next frame transmission. This is shown at 110 in FIG. 7. However, the imperfect transmit spectral mask of the ACK (transmitted to the AP) can create enough adjacent channel interference that it is difficult for the serving radio subsystem 12 to reliably detect CCA on the secondary80 channel. A typical 80 MHz ACK (or block ACK (BA)) with RSSI at −60 dBm would be attenuated to either:

−100 dBm on an alternate-adjacent secondary80 channel or more widely separated (e.g. 36-48+100-140); and then the mask skirts negligibly degrade the AP's secondary80 CCA reliability; or −82 dBm on an adjacent secondary80 (assuming a reasonable transmit spectral mask of approximately −22 dBr); and then the mask skirts are much more likely to trigger CCA detection. The serving radio subsystem 12 cannot know whether the channel was busy due to the ACK or due to a transmission by an OBSS. However, if the serving radio subsystem 12 does not transmit, then no additional collisions are induced.

The likelihood of the serving radio subsystem 12 falsely reporting a busy secondary80 channel, due to a received ACK, increases if the ACK RSSI is higher, and the AP opportunities to switch to transmitting on the wider bandwidth of 80+80 or 160 MHz diminish. Still, if the serving radio subsystem 12 does not transmit at 80+80 MHz or 160 MHz, then no additional collisions are induced. The benefits vary according to the ACK/BA RSSI and tightness of client's spectral mask.

The techniques described herein in connection with FIG. 7 can be used in the configuration of FIG. 1 (with two radio subsystems) in cases when the monitoring radio subsystem is called upon for other monitoring duties on a channel other than the secondary80 channel.

Figure 8A:
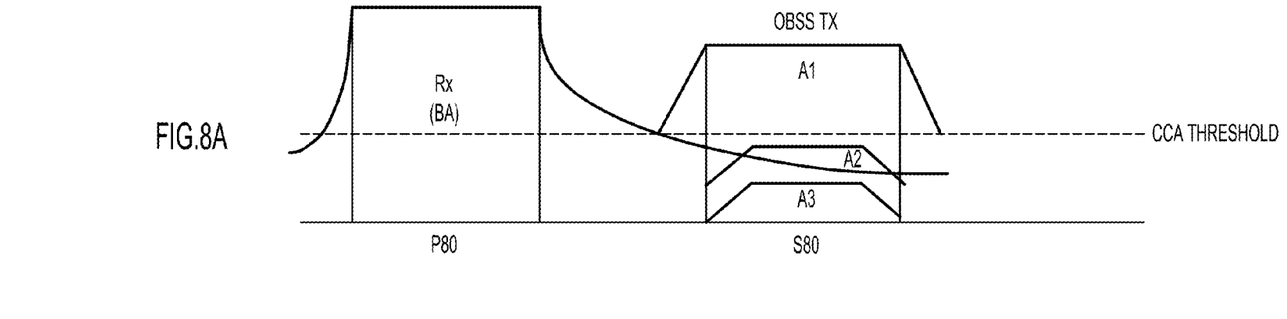
FIGS. 8A and 8B are power spectral density plots illustrating various scenarios of signals received in a secondary channel.
Figure 8B:
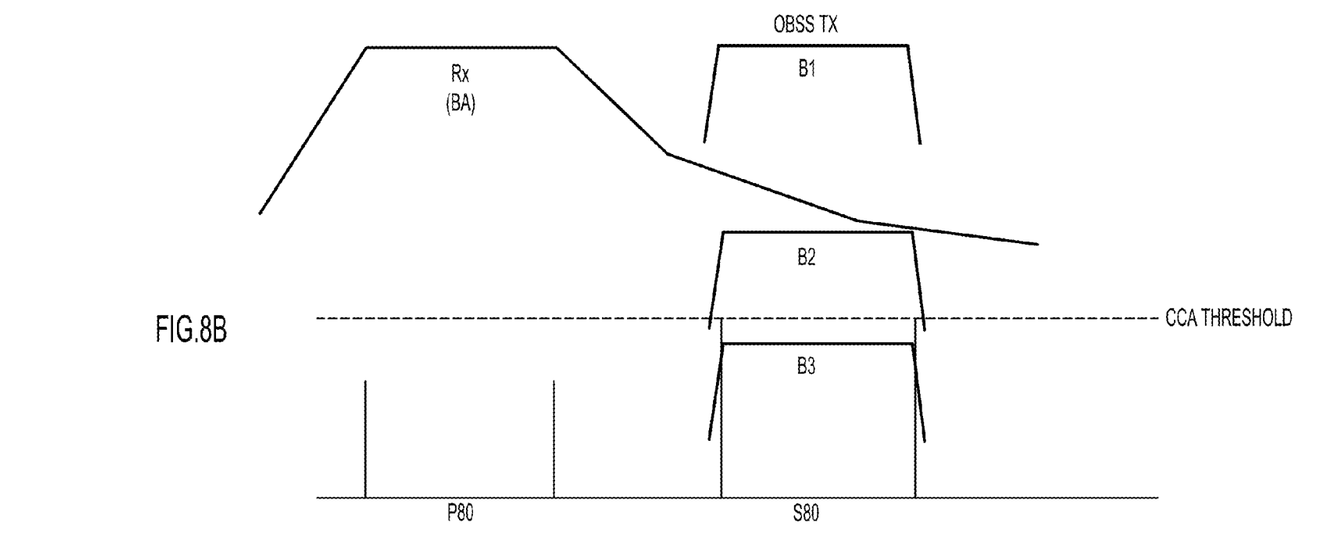
Figure 9:
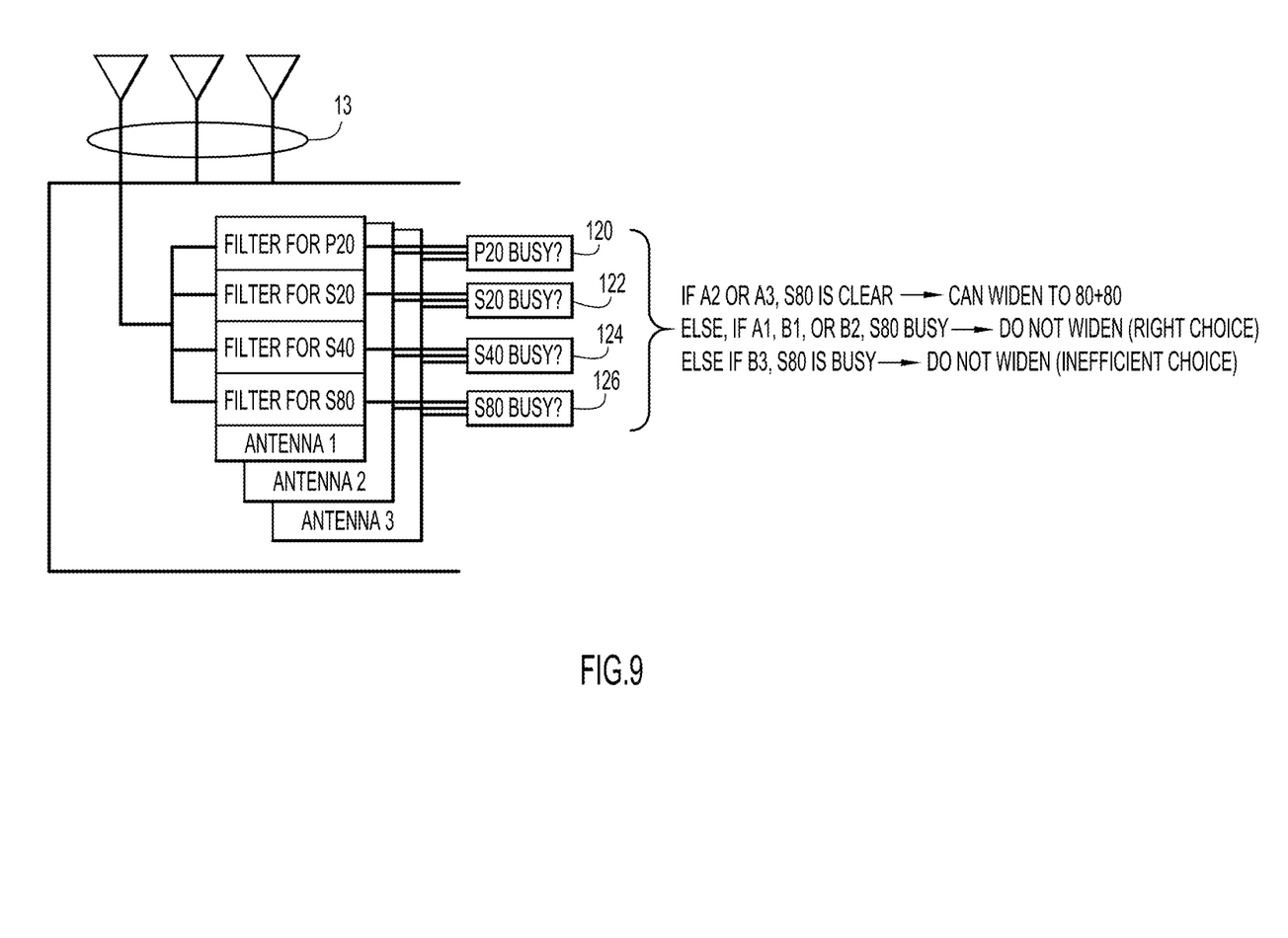
FIG. 9 is a block diagram showing an example arrangement of filters provided in a wireless network device to account for the scenarios shown in FIGS. 8A and 8B.

Reference is now made to FIGS. 8A, 8B and 9. FIGS. 8A and 8B illustrate power spectral density (PSD) of signals for signals received in the primary80 (P80) channel and secondary80 (S80) channel by an AP in various scenarios. FIG. 9 illustrates filters used in an AP, such as one configured as shown in FIG. 7, in which a single radio subsystem is used for transmitting and monitoring. Filters 120, 122, 124 and 126 are provided. Each filter is connected to all of the antennas 13 of the AP. Filter 120 is for the 20 MHz primary channel (P2), filter 122 is for the 20 MHz secondary channel (S20), filter 124 is for the 40 MHz secondary channel (S4) and filter 126 is for the 80 MHz secondary channel (S80). If the signal output from these filters exceeds a CCA threshold, then that channel is said to be busy.

FIG. 8A shows that an inbound signal to the AP in the primary80 channel is occurring, e.g., a received BA. In the secondary80 channel, there are possible scenarios of transmissions from OBSS BSSs, where A1 is an OBSS transmission above the CCA threshold and above the signal level of the BA that has bled over to the secondary80 channel, A2 is an OBSS transmission below the CCA threshold and above the level of the BA, and A3 is an OBSS transmission below the CCA threshold and below the level of the BA. FIG. 8B shows a received BA that is well above the CCA threshold in the secondary80 channel, and B1 is an OBSS transmission above the CCA threshold and above the signal level of the BA, B2 is an OBSS transmission above the CCA threshold and below the signal level of the BA and B3 is an OBSS transmission below the CCA threshold and below the signal level of the BA.

FIG. 9 illustrates the outcomes for the scenarios depicted in FIGS. 8A and 8B. If A2 or A3 occurs, then S80 is clear and the AP can widen a transmission to 80+80. If A1, B1 or B2 occurs, then S80 is busy and the AP cannot wide a transmission to 80+80, and this is the right choice for this scenario. If B3 occurs, S80 is busy and the AP will not widen to an 80+80 transmission, but this is not the efficient decision because B3 is below the CCA threshold and power from the BA is so well above the CCA threshold that the AP will detect the S80 as being busy from an OBSS transmission, when in fact it is not.

In the examples of FIGS. 8A, 8B, and 9, P20+S20=P40, and P40+S40=P80, and P80+S80=160. Monitoring thus involves monitoring P20 (the primary channel), monitoring S20 (a first bandwidth portion of the secondary channel), monitoring S40 (a second bandwidth portion of the secondary channel) and monitoring S80 (a third bandwidth portion of the secondary channel). The third bandwidth portion excludes the first and second bandwidth portions, and the second bandwidth portion excludes the first bandwidth portion. However, the transmission bandwidth enabled by monitoring of the third bandwidth portion and determining it as clear is greater than the first and second bandwidth portions and encompasses the first and second bandwidth portions, and the transmission bandwidth enabled by monitoring of the second bandwidth portion and determining it as clear is greater than the first bandwidth portion and encompasses the first bandwidth portion, and the transmission bandwidth enabled by monitoring of the first bandwidth portion and determining it as clear is greater than the primary channel and encompasses the primary channel.

Figure 10:
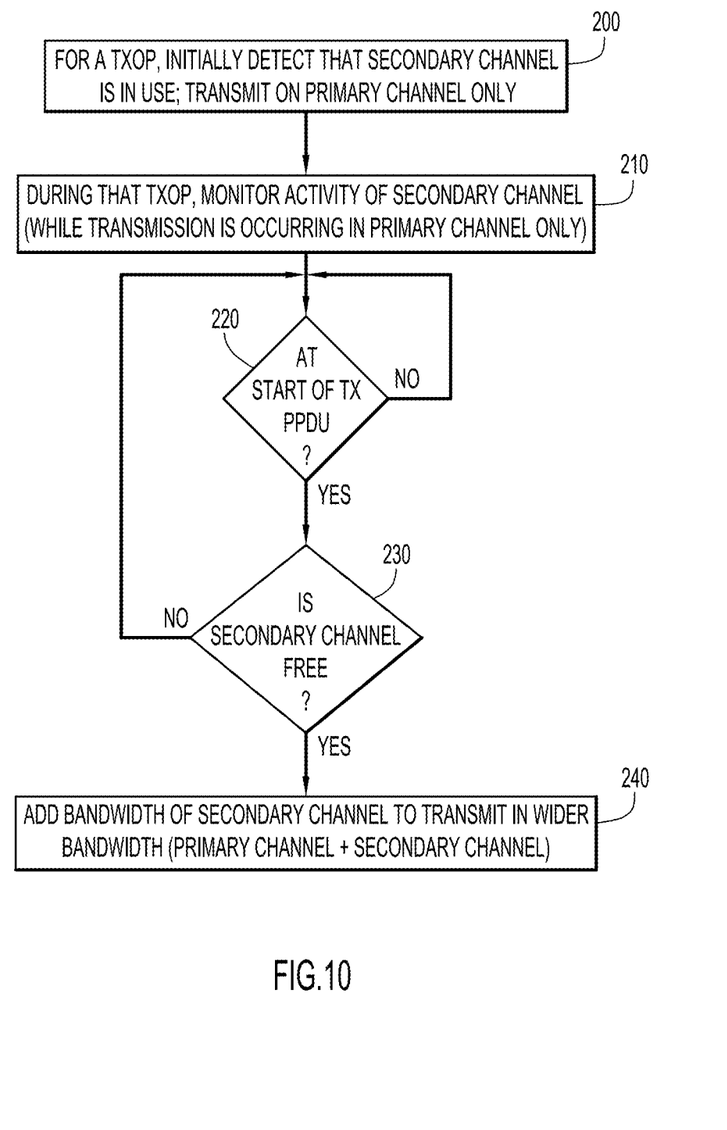
FIG. 10 is an example of a flow chart depicting operations performed in a wireless network device to dynamically enable transmissions of wider channel widths.

Referring now to FIG. 10, a flow diagram is shown that generally depicts the operation flow associated with the techniques described herein. At 200, during a TXOP, it is initially detected that a secondary channel is busy and thus cannot be used for a wider transmission that occupies a primary channel and the secondary channel. Thus, the transmission is sent in the primary channel only. At 210, during the TXOP, the secondary channel is monitored for activity. The monitoring may be performed while the transmission is being sent in the primary channel, as described above in connection with FIGS. 1 and 2, or after the transmission is completed, as described above in connection with FIG. 7.

At 220, it is determined whether a start of a transmit PPDU is queued. If not, then the process loops back until there is (until the end of the TXOP). When there is a start of a transmit PPDU, then at 230, it is determined whether the secondary channel is free based on the monitoring at 210. When it is determined that the secondary channel is free, then bandwidth of the secondary channel can be added to that of the primary channel, and the PPDU is transmitted in wider bandwidth mode in the primary and secondary channels.

In summary, techniques are provided herein to leverage an additional radio in access points to dynamically transmit packets with a wider channel width as channel activities change. Instead of idling portions of the channel that were previously busy during an AP's TXOP, these techniques allow those idle portions to be utilized after they are determined to be suitable for usage. Techniques are also presented herein for signaling schemes between first and second radio subsystems to share the CCA state of the secondary channel. Further still, a single serving radio oftentimes has sufficient information to dynamically transmit packets with a wider channel width as channel activities change.

During a transmit opportunity time interval for a wireless network device, a transmission in a primary channel is sent in a frequency band in which the primary channel and a secondary channel may be used simultaneously to send a wider bandwidth transmission. Activity in the secondary channel is monitored. Based on the monitored activity, it is determined whether the secondary channel is free. When it is determined that the secondary channel is free, the wider bandwidth transmission is sent in the primary and secondary channels.

Accordingly, through the use of these techniques, more opportunities are provided to use the wider channel configurations which provide significantly higher data rates. More efficient channel usage leads to increase in network throughput.

The above description is intended by way of example only.

What is claimed is:

1. A method comprising:
   during a transmit opportunity time interval for a wireless network device, sending from a radio subsystem a transmission in a primary channel without using a secondary channel, within a frequency band containing the primary channel and the secondary channel;
   monitoring activity in the secondary channel;
   determining whether the secondary channel is free based on the monitoring; and
   when it is determined that the secondary channel is free, sending a wider bandwidth transmission in the primary and secondary channels,
   wherein the monitoring comprises monitoring, upon completion of the transmission in the primary channel, the secondary channel with the radio subsystem, and wherein sending the wider bandwidth transmission comprises transmitting the wider bandwidth transmission from the radio subsystem in the primary channel and the secondary channel,
   wherein said sending of the transmission in the primary channel, said monitoring, said determining, and said sending of the wider bandwidth transmission in the primary and secondary channels when it is determined that the secondary channel is free, are performed within the transmit opportunity time interval, and
   wherein monitoring comprises monitoring with separate filters a signal in at least a portion of the primary channel, a signal in a first bandwidth portion of the secondary channel, a signal in a second bandwidth portion of the secondary channel and a signal in a third bandwidth portion of the secondary channel, wherein the third bandwidth portion excludes the first bandwidth portion and the second bandwidth portion and the second bandwidth portion excludes the first bandwidth portion, and wherein a transmission bandwidth enabled by monitoring of the third bandwidth portion and determining that the third bandwidth portion is clear is greater than the first and second bandwidth portions and encompasses the first and second bandwidth portions, and a transmission bandwidth enabled by monitoring of the second bandwidth portion and determining that the second bandwidth portion is clear is greater than the first bandwidth portion and encompasses the first bandwidth portion, and a transmission bandwidth enabled by monitoring of the first bandwidth portion and determining that the first bandwidth portion is clear is greater than the primary channel and encompasses the primary channel.

2. The method of claim 1, wherein sending the wider bandwidth transmission is performed after completion of the transmission in the primary channel.

3. The method of claim 1, wherein sending the transmission comprises sending the transmission in the primary channel using a first radio subsystem of the wireless network device, and wherein monitoring comprises monitoring with a second radio subsystem of the wireless network device during the transmission by the first radio subsystem in the primary channel.

4. The method of claim 3, wherein the wider bandwidth transmission is sent with the first radio subsystem.

5. The method of claim 3, wherein sending the wider bandwidth transmission comprises sending a first portion of the wider bandwidth transmission with the first radio subsystem and a second portion of the wider bandwidth transmission with the second radio subsystem.

6. The method of claim 3, further comprising sending a command from the first radio subsystem to the second radio subsystem to cause the second radio subsystem to begin monitoring the secondary channel, and receiving from the second radio subsystem at the first radio subsystem a response indicating an idle/busy status of the secondary channel, and wherein determining is based on the idle/busy status.

7. The method of claim 6, wherein sending the command and receiving the response are made over a single wire between the first radio subsystem and the second radio subsystem.

8. The method of claim 6, wherein the command is sent from the first radio subsystem to the second radio subsystem over a first wire and the response is sent from the second radio subsystem to the first radio subsystem over a second wire.

9. The method of claim 6, wherein the command and response are sent over a bus between the first radio subsystem and the second radio subsystem.

10. The method of claim 6, wherein the response comprises a predetermined shift pattern sent over a serial bus between the first radio subsystem and the second radio subsystem.

11. The method of claim 6, further comprising carrying additional information in the response from the second radio subsystem to the first radio subsystem.

12. The method of claim 11, wherein the additional information comprises an indication of which class of devices are to be validated before asserting that the secondary channel is clear.

13. The method of claim 11, wherein the additional information comprises an indication of when the transmission in the primary channel will end and when a received acknowledgment is expected to start and end.

14. The method of claim 3, further comprising monitoring the secondary channel with the secondary radio subsystem activity for wireless intrusion detection.

15. The method of claim 3, further comprising the first radio subsystem and second radio subsystem serving wireless clients on different primary channels, and the first radio subsystem monitoring a secondary channel for bandwidth expansion on behalf of the second radio subsystem and the second radio subsystem monitoring a secondary channel for bandwidth expansion on behalf of the first radio subsystem.

16. The method of claim 3, wherein monitoring comprises monitoring, upon completion of the transmission in the primary channel, the secondary channel with the first radio subsystem, when it is determined that the second radio subsystem is occupied or otherwise unable to monitor activity in the secondary channel.

17. The method of claim 1, wherein the primary channel and the secondary channel are non-contiguous.

18. An apparatus comprising:
a first radio subsystem configured to, during a transmit opportunity time interval, send a wireless transmission in a primary channel without using a secondary channel, within a frequency band containing the primary channel and the secondary channel; and
a second radio subsystem configured to monitor activity in the secondary channel to determine whether the secondary channel is free, and when it is determined that the secondary channel is free, causing the first radio subsystem to send at least a portion of the wider bandwidth transmission in the primary and secondary channels,
wherein the first radio subsystem sends the transmission in the primary channel, the second radio subsystem monitors the second channel to determine whether the second channel is free, and the second radio subsystem causes the sending of the wider bandwidth transmission in the primary and secondary channels when it is determined that the secondary channel is free, all within the transmit opportunity time interval,
wherein the second radio subsystem is configured to monitor, upon completion of the transmission in the primary channel, the secondary channel, and wherein the first radio subsystem is configured to send the wider bandwidth transmission by transmitting the wider bandwidth transmission in the primary channel and the secondary channel,
wherein the second radio subsystem is further configured to monitor, with separate filters, a signal in at least a portion of the primary channel, a signal in a first bandwidth portion of the secondary channel, a signal in a second bandwidth portion of the secondary channel and a signal in a third bandwidth portion of the secondary channel, wherein the third bandwidth portion excludes the first bandwidth portion and the second bandwidth portion and the second bandwidth portion excludes the first bandwidth portion, and wherein a transmission bandwidth enabled by monitoring of the third bandwidth portion and determining that the third bandwidth portion is clear is greater than the first and second bandwidth portions and encompasses the first and second bandwidth portions, and a transmission bandwidth enabled by monitoring of the second bandwidth portion and determining that the second bandwidth portion is clear is greater than the first bandwidth portion and encompasses the first bandwidth portion, and a transmission bandwidth enabled by monitoring of the first bandwidth portion and determining that the first bandwidth portion is clear is greater than the primary channel and encompasses the primary channel.

19. The apparatus of claim 18, wherein the first radio subsystem sends the wider transmission after completion of the transmission in the primary channel.

20. The apparatus of claim 18, wherein the first radio subsystem is configured to send a first portion of the wider bandwidth transmission and the second radio subsystem is configured to send a second portion of the wider bandwidth transmission.

21. The apparatus of claim 18, wherein the first radio subsystem is configured to send a command to the second radio subsystem to cause the second radio subsystem to begin monitoring the secondary channel, and to receive from the second radio subsystem a response indicating an idle/busy status of the secondary channel.

22. The apparatus of claim 21, further comprising a single wire configured to carry the command and response between the first radio subsystem and the second radio subsystem.

23. The apparatus of claim 18, wherein the first radio subsystem and second radio subsystem are configured to serve wireless clients on different primary channels, and the first radio subsystem is configured to monitor a secondary channel for bandwidth expansion on behalf of the second radio subsystem and the second radio subsystem is configured to monitor a secondary channel for bandwidth expansion on behalf of the first radio subsystem.

24. The method of claim 18, wherein the first radio subsystem is configured to monitor, upon completion of the transmission in the primary channel, the secondary channel when it is determined that the second radio subsystem is occupied or otherwise unable to monitor activity in the secondary channel.

25. One or more non-transitory computer readable storage media encoded with software comprising computer executable instructions and when the software is executed is operable to, in a wireless network device:

during a transmit opportunity time interval for the wireless network device, cause a transmission to be sent in a primary channel without using a secondary channel, within a frequency band containing the primary channel and the secondary channel;

monitor activity in the secondary channel;

determine whether the secondary channel is free; and when it is determined that the secondary channel is free, cause the wider bandwidth transmission to be sent in the primary and secondary channels, send in the primary channel a transmission from a radio subsystem, wherein the software operable to monitor comprises software operable to monitor, upon completion of the transmission in the primary channel, the secondary channel with the radio subsystem, and wherein the software operable to cause the wider bandwidth transmission to be sent comprises software operable to cause the sending of the wider bandwidth transmission from the radio subsystem in the primary channel and the secondary channel, wherein operations to send the transmission in a primary channel, monitor activity in the secondary channel, determine whether the second channel is free, and cause the sending of the wider bandwidth transmission in the primary and secondary channels when it is determined that the secondary channel is free, are performed within the transmit opportunity time interval, wherein the software operable to monitor activity in the secondary channel is operable to monitor, with separate filters, a signal in at least a portion of the primary channel, a signal in a first bandwidth portion of the secondary channel, a signal in a second bandwidth portion of the secondary channel and a signal in a third bandwidth portion of the secondary channel, wherein the third bandwidth portion excludes the first bandwidth portion and the second bandwidth portion and the second bandwidth portion excludes the first bandwidth portion, and wherein the transmission bandwidth enabled by monitoring of the third bandwidth portion and determining that the third bandwidth portion is clear is greater than the first and second bandwidth portions and encompasses the first and second bandwidth portions, and the transmission bandwidth enabled by monitoring of the second bandwidth portion and determining that the second bandwidth portion is clear is greater than the first bandwidth portion and encompasses the first bandwidth portion, and the transmission bandwidth enabled by monitoring of the first bandwidth portion and determining that the first bandwidth portion is clear is greater than the primary channel and encompasses the primary channel.

26. The computer readable storage media of claim 25, wherein the instructions operable to cause the transmission in the primary channel to be sent comprise instructions operable to cause a first radio subsystem in the wireless network device to send the transmission in the primary channel, and the instructions operable to monitor comprise instructions operable to monitor with a second radio subsystem in the wireless network device during the transmission by the first radio subsystem in the primary channel.

27. The computer readable storage media of claim 25, further comprising instructions operable to send in the primary channel a transmission from a radio subsystem, cause the radio subsystem to monitor the secondary channel after completion of the transmission in the primary channel, and to send the wider bandwidth transmission with the radio subsystem in the primary and secondary channels.

* * * * *